(12) United States Patent
Cai et al.

(10) Patent No.: US 11,049,424 B2
(45) Date of Patent: Jun. 29, 2021

(54) SPLICING FRAME DEVICE AND SPLICING METHOD THEREOF

(71) Applicant: ROE Visual Co., Ltd, Shenzhen (CN)

(72) Inventors: Danhu Cai, Shenzhen (CN); Shunwen Tian, Shenzhen (CN); Chen Lu, Shenzhen (CN); Dries Vermeulen, Shenzhen (CN)

(73) Assignee: ROE VISUAL CO., LTD., Guangdong (CN)

( * ) Notice: Subject to any disclaimer, the term of this patent is extended or adjusted under 35 U.S.C. 154(b) by 539 days.

(21) Appl. No.: 16/066,806

(22) PCT Filed: May 28, 2018

(86) PCT No.: PCT/CN2018/088682
§ 371 (c)(1),
(2) Date: Jun. 28, 2018

(87) PCT Pub. No.: WO2019/153583
PCT Pub. Date: Aug. 15, 2019

(65) Prior Publication Data
US 2020/0258431 A1    Aug. 13, 2020

(30) Foreign Application Priority Data

Feb. 6, 2018  (CN) .......................... 201820219936.7

(51) Int. Cl.
*G09F 9/302*  (2006.01)
*G02F 1/1333*  (2006.01)

(52) U.S. Cl.
CPC ........ *G09F 9/3026* (2013.01); *G02F 1/13336* (2013.01); *G02F 1/133308* (2013.01); *G02F 1/133322* (2021.01); *G02F 1/133325* (2021.01)

(58) Field of Classification Search
CPC ........ G02F 1/13336; G02F 1/133322–133328; H01L 27/3293; G09F 9/302–3026; G06F 3/1446
See application file for complete search history.

(56) References Cited

U.S. PATENT DOCUMENTS

| | | | | |
|---|---|---|---|---|
| 2003/0234343 A1* | 12/2003 | Cok | ..................... | H01L 27/3293 250/208.1 |
| 2005/0248935 A1* | 11/2005 | Strip | ................... | H01L 51/5203 362/145 |
| 2016/0292820 A1* | 10/2016 | Kuan | ..................... | G06T 3/4038 |

FOREIGN PATENT DOCUMENTS

| | | | | |
|---|---|---|---|---|
| CN | 103712041 A | * | 4/2014 | ............... G01B 5/14 |
| CN | 105074805 A | * | 11/2015 | ........... G02B 26/001 |

(Continued)

*Primary Examiner* — Mariceli Santiago
(74) *Attorney, Agent, or Firm* — Sinorica, LLC

(57) ABSTRACT

The invention discloses a splicing frame device and a splicing method thereof, wherein the splicing frame device is used for installing a display screen body and comprises at least two layers of frames connected up and down, each layer of frame comprises at least two frame bodies, in two adjacent layers of frames, a splicing seam between the frame bodies in the upper layer and a splicing seam between the frame bodies in the lower layer are arranged in a misplaced way, and the frame bodies at two sides of the splicing seam are both connected to the frame body at an end of the splicing seam. The splicing frame device can also be an integral structure even without a transverse connecting structure, which greatly improves the structure stability of the splicing frame device and is conductive to reducing the manufacturing cost of the splicing frame device.

19 Claims, 11 Drawing Sheets

(56) References Cited

FOREIGN PATENT DOCUMENTS

| | | | | |
|---|---|---|---|---|
| CN | 206931321 U | * | 1/2018 | |
| CN | 109859636 A | * | 6/2019 | |
| CN | 110502204 A | * | 11/2019 | |
| KR | 20200024930 A | * | 3/2020 | ........... H01L 23/544 |

* cited by examiner

SPLICING FRAME DEVICE AND SPLICING METHOD THEREOF

TECHNICAL FIELD

The present invention relates to the field of display screen technology, and more particularly, to a splicing frame device and a splicing method thereof.

BACKGROUND

A splicing frame device is used for installing a display screen body and comprises at least two layers of frames connected up and down, and each layer of frame comprises at least two frame bodies. As shown in FIG. 1, in the existing splicing frame device, more than four frame bodies 1 are arranged in an n*m array (n≥2, m≥2, and both n and m are positive integers), and each frame body 1 is the same. In this way, in two adjacent layers of frames, a splicing seam 2 located between adjacent frame bodies 1 in an upper frame is aligned with a splicing seam 2 located between adjacent frame bodies 1 in a lower frame, so that a connecting relationship between the frame bodies 1 on two sides of the splicing seam 2 is required (a transverse connecting structure is arranged). Otherwise, the splicing frame device can have a hidden danger of unstable structure (the specific characterization of this hidden danger is that: when a small force is applied to any frame in the splicing frame device, a vertical column where the frame is located can be poured while the other vertical columns are not affected).

Therefore, it is necessary to provide a splicing frame device with a more stable structure and a splicing method thereof.

SUMMARY

The technical problem to be solved by the present invention is to: provide a splicing frame device with a more stable structure and a splicing method thereof, the splicing frame device can also be an integral structure even without a transverse connecting structure.

In order to solve the technical problem above, the technical solution adopted by the present invention is that: a splicing frame device is used for installing a display screen body and comprises at least two layers of frames connected up and down, each layer of frame comprises at least two frame bodies, in two adjacent layers of frames, a splicing seam between the frame bodies in the upper layer and a splicing seam between the frame bodies in the lower layer are arranged in a misplaced way, and the frame bodies at two sides of the splicing seam are both connected to the frame body at an end of the splicing seam.

In order to solve the technical problem above, the present invention further adopts the following technical solution: a splicing method of the splicing frame device comprises the following steps:
  step S01: selecting a plurality of frame bodies with different sizes according to requirements;
  step S02: transversely arranging at least two frame bodies with the same or different sizes in sequence to form a first layer of frame;
  step S03: placing at least one frame body on an upper or lower layer of the first layer of frame to form a second layer of frame; wherein, when the second layer of frame has more than two frame bodies, splicing seams of the second layer of frame and the first layer of frame are arranged in a misplaced way, and the frame bodies located at two sides of the splicing seam are respectively connected to the frame body at an end of the splicing seam; and
  step S04: continuously arranging other layers of frame bodies on the first layer of frame or below the second layer of frame according to step S03.

The present invention has the beneficial effect that: the splicing frame device can also be an integral structure even without a transverse connecting structure, which greatly improves the structure stability of the splicing frame device and is conductive to reducing the manufacturing cost of the splicing frame device; no transverse connecting structure or device is required, which is conductive to reducing a size of the splicing seam, improving a display effect of a display screen having the splicing frame device, and reducing bright and dark line and other display defects; and a user can conduct personalized splicing, which is conductive to improving the user experience.

Figure 1:
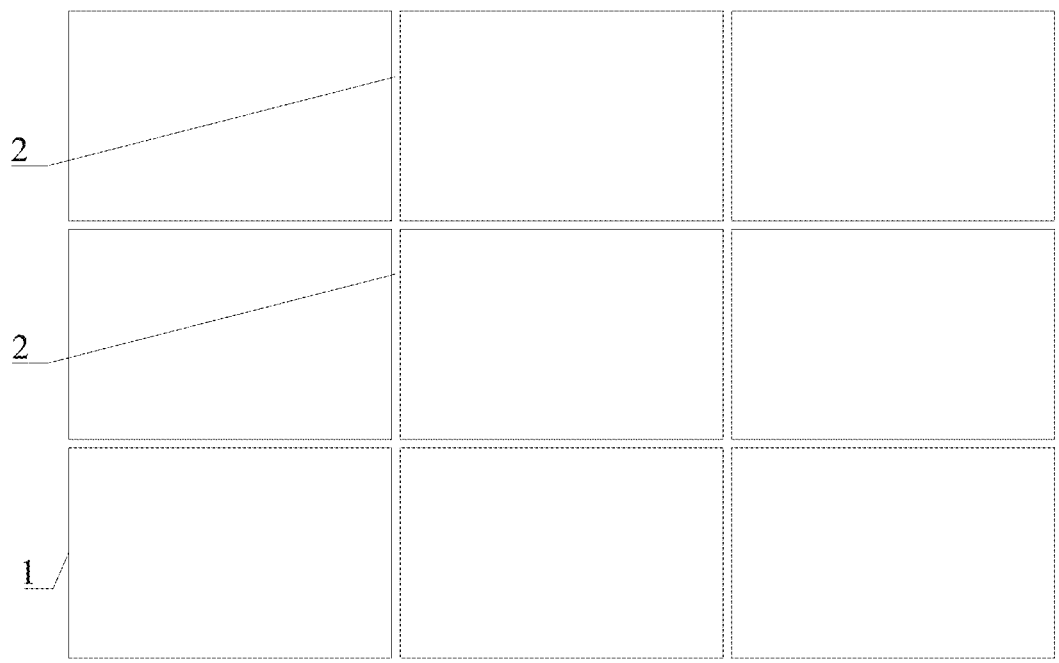
FIG. 1 is a simplified schematic diagram illustrating a structure of a splicing frame device according to the prior art.

REFERENCE NUMERALS 1 refers to frame body;
2 refers to splicing seam;

31 refers to first basic section;
32 refers to second basic section;
4 refers to first lock catch;
5 refers to second lock catch;
6 refers to supporting rod;
7 refers to sub-frame body;
8 refers to base beam;
81 refers to beam section; and
82 refers to gap.

DETAILED DESCRIPTION OF THE EMBODIMENTS

In order to describe the technical content, the achieved object, and the effect of the present invention in detail, the following description will be given with reference to the embodiments and the accompanying drawings.

The most crucial conception of the present invention is that: in two adjacent layers of frames, a splicing seam between the frame bodies in the upper layer and a splicing seam between the frame bodies in the lower layer are arranged in a misplaced way, the frame bodies at two sides of the splicing seam are both connected to the frame body at an end of the splicing seam, and the splicing frame device can also be an entirety even without a transverse connecting structure or device.

In the description and the claims, the term "splicing seam" refers specifically to a longitudinal gap between two adjacent frame bodies in the splicing frame device.

It shall be noted that the splicing frame device of the present invention can not use the transverse connecting structure or the device, and does not mean that the transverse connecting structure or the device cannot be used in the splicing frame device of the present invention.

Referring to FIG. 2 to FIG. 9b, a splicing frame device is used for installing a display screen body and comprises at least two layers of frames connected up and down, each layer of frame comprises at least two frame bodies 1, in two adjacent layers of frames, a splicing seam 2 between the frame bodies 1 in the upper layer and a splicing seam 2 between the frame bodies 1 in the lower layer are arranged in a misplaced way, and the frame bodies 1 at two sides of the splicing seam 2 are both connected to the frame body 1 at an end of the splicing seam 2.

It can be known from the description above that, the present invention has the beneficial effect that: The splicing frame device can also be an integral structure even without a transverse connecting structure, which greatly improves the structure stability of the splicing frame device and is conductive to reducing the manufacturing cost of the splicing frame device; no transverse connecting structure or device is required, which is conductive to reducing a size of the splicing seam and improving a display effect of a display screen having the splicing frame device; and a user can conduct personalized splicing, which is conductive to improving the user experience.

The technical solution of the present application, such as a stretcher bond mode for establishing a building, is used to establish an integral structure of a display screen, so as to generate a staggered joint structure similar to the building, thereby avoiding continuous splicing seams of adjacent layers from generating continuous splicing gaps.

This structure forms a structure similar to a load-bearing wall between the display screen and the adjacent display screen thereof, which increases a transverse strength and a stretching strength of the integral structure.

Certainly, the technical solution of the present application can further allow the stacking in a conventional form.

Further, the frame body 1 comprises an upper frame and a lower frame with equal lengths, the lower frame is composed of two first basic sections 31 and N second basic sections 32, a sum of lengths of the two first basic sections 31 and lengths of the N second basic sections 32 is equal to a length of the lower frame, and N is an integer greater than or equal to 0; and the second basic section 32 is located between the two first basic sections 31, a sum of lengths of the two first basic sections 31 and a width of the splicing seam 2 is equal to the length of the second basic section 32.

Further, in the same frame body 1, the lengths of the two first basic sections 31 are equal.

It can be known from the description above that, in the same frame body, the lengths of the two first basic sections are equal, which facilitates a manufacturer to produce and manufacture the frame body.

Further, in the same frame body 1, the length of the first basic section 31 is less than or equal to a half length of the second basic section 32.

It can be known from the description above that, when the length of the first basic section is equal to a half length of the second basic section, a width of the splicing seam is infinitely close to zero. That is, when outer side walls of the first basic sections of adjacent frame bodies in a horizontal direction of the frame body is infinitely close to each other, the projection is in a vertical direction, the first basic section is just located on the second basic section and occupies a half of the second basic section, which is conductive to further increasing the strength of the structure of the splicing frame device. In addition, the splicing seam between adjacent frame bodies is small, which is conductive to improving a display effect of a display screen. Certainly, when a space between the outer side walls of the first basic sections of the adjacent frame bodies in the horizontal direction is larger, the display screen with a larger size can be installed in the frame body, and the display screen can be used to shade the space, so that a display problem about larger light leakage between the display screens cannot be generated.

Further, at least one layer of frame has more than two frame bodies 1 having the lower frames with different lengths. In this way, specific splicing can be performed according to the use environment. When a vacancy appears at the ends (left end or right end) of two adjacent layers of frames, the frames with different sizes can be used for compensating the vacancy to form a display wall in a positive geometry as a whole, and certainly, the vacancy cannot be compensate either, so as to obtain other special display effects.

Further, in the same frame body 1, the lower frame is provided with a first lock catch 4, and the upper frame is provided with a second lock catch 5 matched with the first lock catch 4 in the lower frame of the other frame body 1; when N is equal to 0, a quantity of the first lock catch 4 is equal to 1, and the first lock catch 4 is located at a joint of the two first basic sections 31; and when N is greater than 0, the quantity of the first lock catch 4 is greater than or equal to 1, and the first lock catch 4 is located at an end of the second basic section 32.

Further, in the frame body 1, the quantity of the first lock catch 4 is N+1, when N is greater than 0, two ends of the second basic section 32 are both provided with the first lock catch 4.

It can be known from the description above that, a number of first lock catches are provided, so that two connected frame bodies in the lower frame can be retracted to various extents. That is, a space between two adjacent frame bodies in a horizontal direction can be adjusted, which can make the splicing of the frame more flexible and be combined freely.

Further, in the frame body 1, a quantity of the second lock catch 5 is equal to the quantity of the first lock catch 4, and the second lock catch 5 is arranged in one-to-one correspondence with the first lock catch 4.

It can be known from the description above that, the quantity of the second lock catch is equal to the quantity of the first lock catch, and the second lock catch is arranged in one-to-one correspondence with the first lock catch, which is conductive to further improving the stability of the structure of the splicing frame device.

Further, a supporting rod 6 is arranged in the frame body 1, the first lock catch 4 is a rotary lock catch, one end of the supporting rod 6 is connected to the first lock catch 4, and the other end of the supporting rod 6 is connected to the upper frame; or, the second lock catch 5 is a rotary lock catch, one end of the supporting rod 6 is connected to the second lock catch 5, and the other end of the supporting rod 6 is connected to the lower frame.

It can be known from the description above that, the supporting rod is preferably arranged in a vertical orientation to greatly increase the structural strength of the frame body. The rotary lock catch is used as the first lock catch (or second lock catch), and the rotary lock catch is connected to the supporting rod, which fully optimizes the structure of the frame body, so that more components can be contained in a limited space of the frame body. Moreover, the frame body can be more beautiful, and meanwhile, the supporting rod and the rotary lock catch are in a same straight line, and an external force from the rotary lock catch at a connecting position is born by the supporting rod to balance the entire force bearing of the frame body, so that the multiple layers of frame bodies are more stable after connection. The first lock catch 4 and the second lock catch 5 are mating members that can be locked to each other, and when the first lock catch 4 is the rotary lock catch, the second lock catch can be a lock hole; and vice versa.

Further, the frame body 1 is a parallelogram, and the frame body 1 is formed by splicing at least two sub-frame bodies 7.

It can be known from the description above that, the frame is preferably a rectangle, and the sub-frame body can be a polygon, such as a triangle, a rectangle, a pentagon, a hexagon, or the like; and the sub-frame body can also be a round, an oval or other irregular shapes, as long as at least two sub-frame bodies can be spliced to each other to form the rectangle.

Further, at least one set of opposite angles of the frame body 1 are respectively provided with an identification mark, and the identification mark is located at one side of the frame body 1 far from the display screen body.

It can be known from the description above that, the setting of the identification mark facilitates the user to quickly identify the frame body in the splicing frame device, thereby improving the efficiency of disassembling and assembling the splicing frame device by the user and improving the user experience. The identification mark can be a color-block area (for example, a red block, a yellow block, etc.) formed after spreading by colored painting, can also be some specific structure (such as a convex, a concave, etc.), or can further be other forms facilitating the identification.

In order to improve the stability of the structure of the splicing frame device, the frame has the vertically arranged supporting rod. Preferably, the supporting rod is a carbon fiber rod. The carbon fiber rod is light in weight and strong in strength, which is conductive to reducing a weight of the frame, thereby guaranteeing the structural strength of the frame.

Further, the splicing frame device further comprises a base beam 8 stacked below the frame at the lowest layer, and the base beam 8 comprises at least two beam sections 81 connected to the frame at the lowest layer; and in the frame at the lowest layer, the splicing seam 2 and a gap 82 between two adjacent beam sections 81 are arranged in a misplaced way, and the frame bodies 1 at two sides of the splicing seam 2 are both connected to the beam section 81 at the end of the splicing seam 2.

It can be known from the description above that, the base beams can be configured in various widths according to the different widths of the frames, and the misplaced splicing can be realized at a bottom of the frame at the lowest layer and the frame at the lowest layer according to requirements, so that the base beam is more adaptive and the flexible to install, thereby avoiding the inconvenience in use caused by the mismatching between the base beam and the size of the frame body; The gap in the base beam and the splicing seam in the frame at the lowest layer are arranged in a misplaced way, which is conducive to further improving the stability of the structure of the splicing frame device, and facilitating the overall base-installation of the display screen.

Further, the base beam 8 is provided with the second lock catch 5 matched with the first lock catch 4 in the frame at the lowest layer.

It can be known from the description above that, when the base beam is used as a support to assemble the display screen, the base beam can be quickly assembled with the frame body in the frame at the lowest layer.

The present invention further comprises a splicing method applied to the splicing frame device, comprising the following steps:

step S01: selecting a plurality of frame bodies with different sizes according to requirements;

step S02: transversely arranging at least two frame bodies with the same or different sizes in sequence to form a first layer of frame;

step S03: placing at least one frame body on an upper or lower layer of the first layer of frame to form a second layer of frame; wherein, when the second layer of frame has more than two frame bodies, splicing seams of the second layer of frame and the first layer of frame are arranged in a misplaced way, and the frame bodies located at two sides of the splicing seam are respectively connected to the frame body at an end of the splicing seam; and step S04: continuously arranging other layers of frame bodies on the first layer of frame or below the second layer of frame according to step S03.

Further, the splicing method further comprises step S05: selecting, at an outermost end position of two ends of each layer of frame, the frame consistent with a width difference size according to the width difference of adjacent layers of frames at an outermost end position and locking the frame body with the adjacent layers of frame bodies through the first lock catch or the second lock catch.

Further, the splicing method further comprises step S06 of arranging the base beam below the frame at the lowest layer, arranging the base beam at the splicing seam of the frame body, and selecting the base beam consistent with the size of the frame is body at the splicing seam according to the sizes of adjacent frame bodies at the splicing seam, so that the rotary lock catch on the base beam is locked with the frame body.

Assembling the integral structure of the display screen by the splicing method above can reduce bright and dark lines, and other display defects, and can flexibly assemble the entirety of the display screens in different shapes and structures according to actual conditions.

Embodiment

Referring to FIG. 2 to FIG. 9b, the embodiment of the present invention is that: a splicing frame device is used for installing a display screen body and comprises at least two layers of frames connected up and down, each layer of frame comprises at least two frame bodies 1, in two adjacent layers of frames, a splicing seam 2 between two adjacent frame bodies 1 in the upper layer frame and a splicing seam 2 between two adjacent frame bodies 1 in the lower layer frame are arranged in a misplaced way, and the frame bodies 1 at two sides of the splicing seam 2 are both connected to the frame body 1 at an end of the splicing seam 2.

Figure 3:
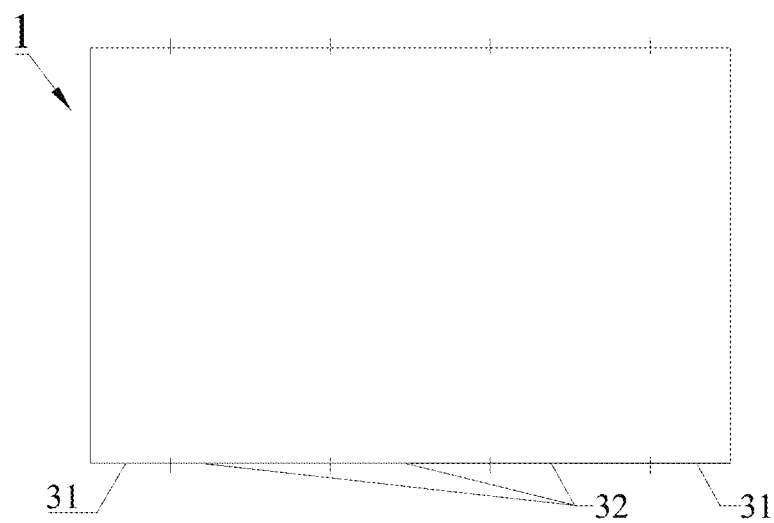
FIG. 3 is a simplified schematic diagram illustrating a frame structure in the splicing frame device according to the present invention.

As shown in FIG. 3, the frame body 1 comprises an upper frame and a lower frame with equal lengths, the lower frame is composed of two first basic sections 31 and N second basic sections 32, a sum of lengths of the two first basic sections 31 and lengths of the N second basic sections 32 is equal to a length of the lower frame, and N is an integer greater than or equal to 0; and the second basic section 32 is located between the two first basic sections 31, a sum of lengths of the two first basic sections 31 and a width of the splicing seam 2 is equal to the length of the second basic section 32. In short, the lower frame is in an elongated shape and comprises a first basic section 31, N second basic sections 32, and another first basic section 31 sequentially connected. Similarly, the upper frame also comprises a first basic section, N second basic sections, and another first basic section sequentially connected.

Figure 2:
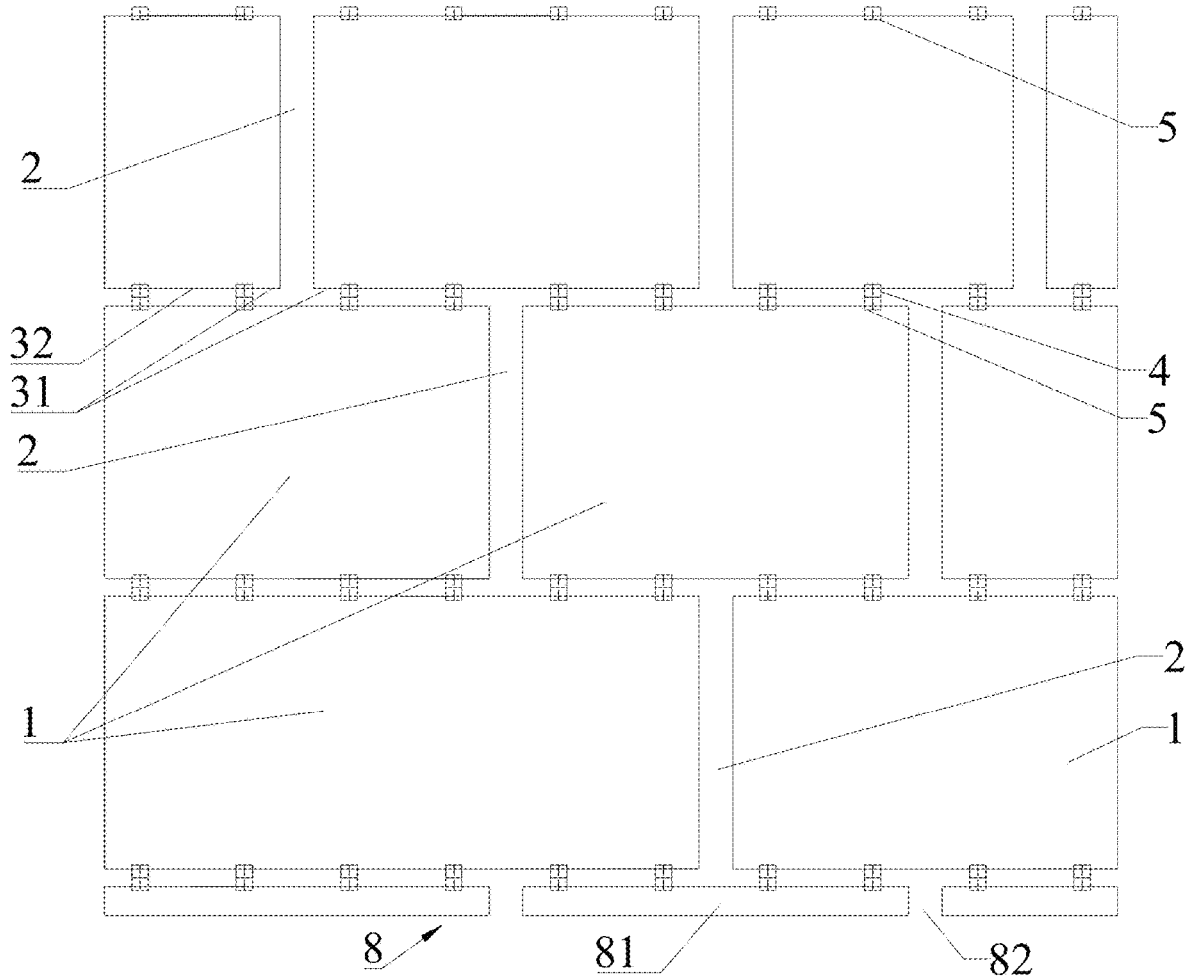
FIG. 2 is a simplified schematic diagram illustrating a structure of a splicing frame device according to the embodiments of the present invention.

Preferably, in a set of splicing frame devices, the lengths of all second basic sections 32 in all frame bodies 1 are equal, the lengths of all first basic sections 31 close to left sides of the frame bodies 1 are equal, and the lengths of all first basic sections 31 close to right sides of the frame bodies 1 are equal. Refer to FIG. 2 for details. The relationship above can be clearly seen from FIG. 2.

Figure 4:
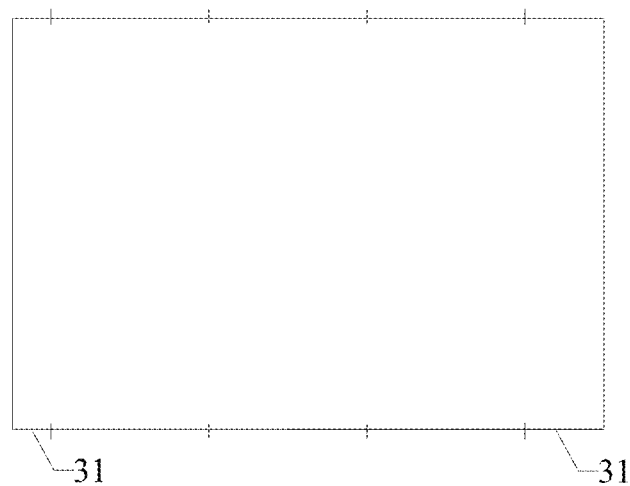
FIG. 4 is a simplified schematic diagram illustrating a frame structure in another splicing frame device according to the present invention.

In addition, in the same frame body 1, the length of the first basic section 31 close to the left side of the frame body 1 and the length of the first basic section 31 close to the right side of the frame body 1 can be equal (as shown in FIG. 3), and can also be unequal (as shown in FIG. 4). In order to reduce the manufacturing cost on the frame body 1 of the manufacturer, it is preferable that the lengths of the two first basic sections 31 are equal in the same frame body 1.

Figure 5:
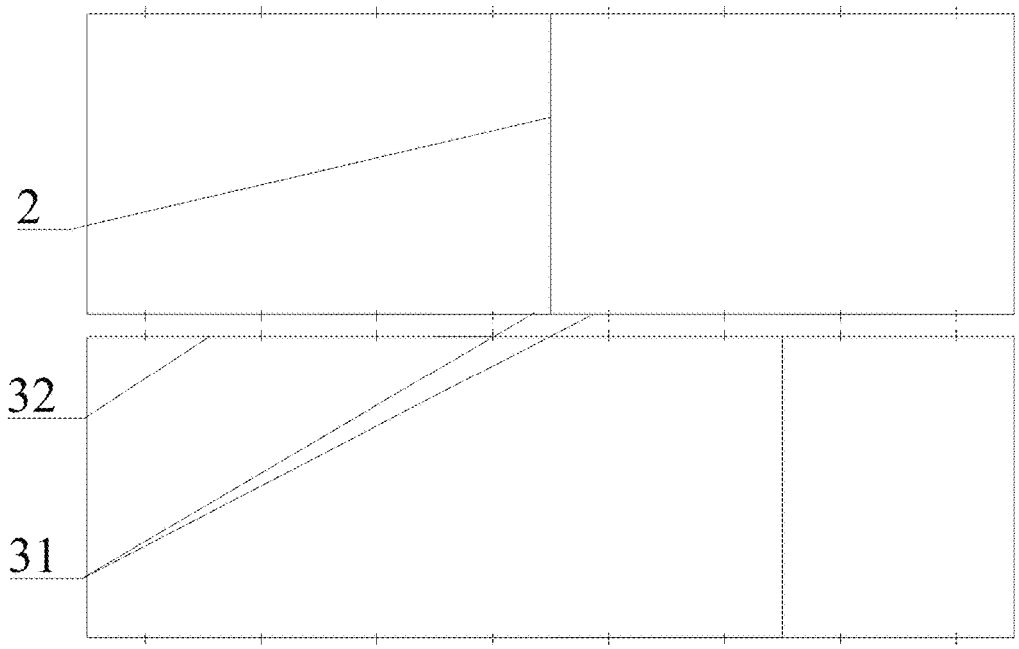
FIG. 5 is a simplified schematic diagram illustrating a structure of another splicing frame device according to the present invention (when a splicing seam is close to 0)

Further, in the same frame body 1, the length of the first basic section 31 is less than or equal to a half length of the second basic section 32. As shown in FIG. 2, the length of the first basic section 31 is less than a half length of the second basic section 32, and it can be seen from the figure that, at the moment, the width of the splicing seam 2 between adjacent frame bodies 1 is larger; and as shown in FIG. 5, the length of the first basic section 31 is equal to a half length of the second basic section 32, and it can be seen from the figure that, at the moment, the width of the splicing seam 2 between adjacent frame bodies 1 is infinitely close to zero.

Further, referring to FIG. 2, at least one layer of frame has more than two frame bodies 1 having the lower frames with different lengths. The reason why the lengths of the two frame bodies are different is that the quantity of the second basic section included in the lower frame (upper frame) is different.

As shown in FIG. 2, the frame body 1 of the upper layer frame and the frame body 1 of the lower layer frame are connected by a lock catch, and specifically, in the same frame body 1, the lower frame is provided with a first lock catch 4, and the upper frame is provided with a second lock catch 5 matched with the first lock catch 4 in the lower frame of the other frame body 1;

when N is equal to 0, a quantity of the first lock catch 4 is equal to 1, and the first lock catch 4 is located at a joint of the two first basic sections 21, as shown in FIG. 2, if the lengths of two first basic sections 31 of the lower frame of the frame body 1 are equal at the moment, the first lock catch 4 is located at a middle point position of the lower frame of the frame body 1 (corresponding to the frame body at top right corner in the splicing frame device in FIG. 2); and when N is greater than 0, the quantity of the first lock catch 4 is greater than or equal to 1, and the first lock catch 4 is located at an end of the second basic section 32. The end of the second basic section 32 refers to the joint of the second basic section 32 and the first basic section 31 or the joint of two adjacent second basic sections 32. It shall be noted that two conditions exist at the moment, firstly, as shown in FIG. 6, one end of a portion of the second basic sections 32 has the first lock catch 4, and the other end of the second basic section 32 does not have the first lock catch 4; two ends of the other portion of the second basic sections 32 do not have the first lock catches 4; and secondly, as shown in FIG. 2, two ends of all second basic sections 32 have the first lock catches 4, and at the moment, two adjacent second basic sections 32 preferably share one first lock catch 4.

Figure 6:
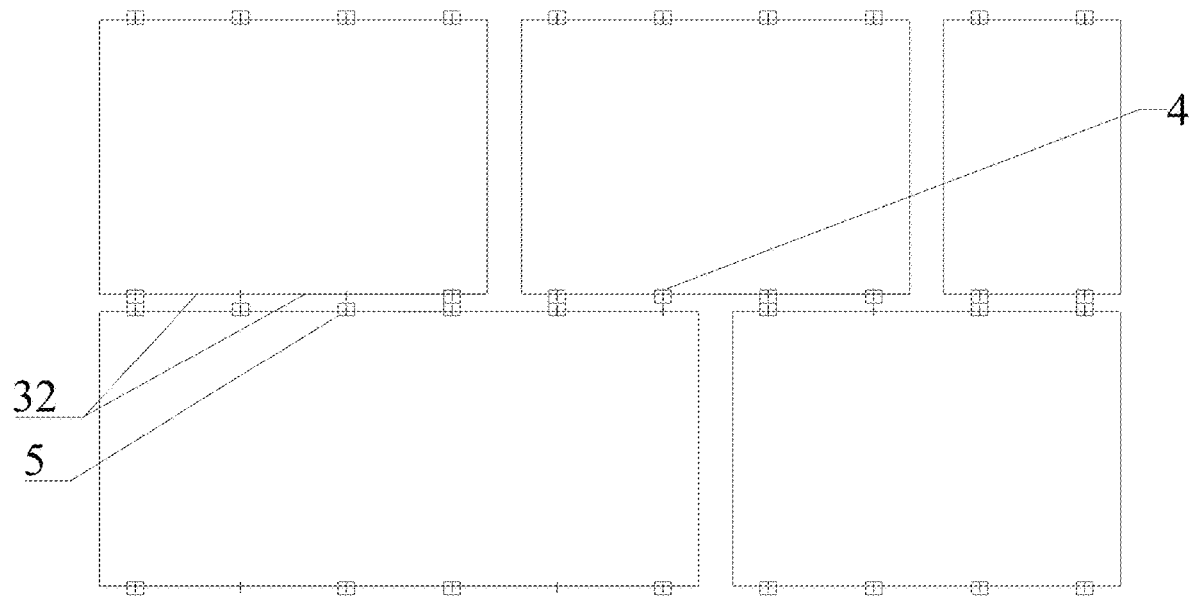
FIG. 6 is a simplified schematic diagram illustrating the structure of another splicing frame device according to the present invention (when partial first and second lock catches are idle)

In addition, it shall be noted that, in the same frame body 1, the quantity of the second lock catch 5 and the quantity of the first lock catch 4 can be equal or unequal; and when the quantity of the second lock catch 5 and the quantity of the first lock catch 4 are unequal, as shown in FIG. 6, partial the second lock catches 5 (the first lock catches 4) will be in an empty state, but the connection of the upper and lower frames cannot be affected. Preferably, in the frame body 1, the quantity of the first lock catch 4 is N+1, when N is greater than 0, two ends of the second basic section 32 are both provided with the first lock catch 4, and in the frame body 1, the quantity of the second lock catch 5 is equal to the quantity of the first lock catch 4, and the second lock catch 5 is arranged in one-to-one correspondence with the first lock catch 4.

The upper layer frame body 1 can be retracted by an integral multiple length of the second basic section 32 relative to the lower layer frame body 1, and the specific explanation is as follows.

Figure 7A:
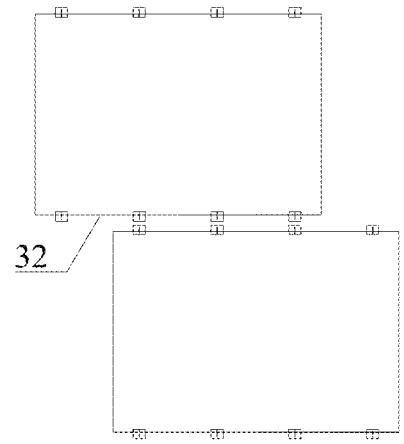
FIGS. 7a to 7c and 7d to 7f are respectively schematic diagrams illustrating the retraction of upper layer and lower layer frame bodies in the splicing frame device according to the present invention.
Figure 7B:
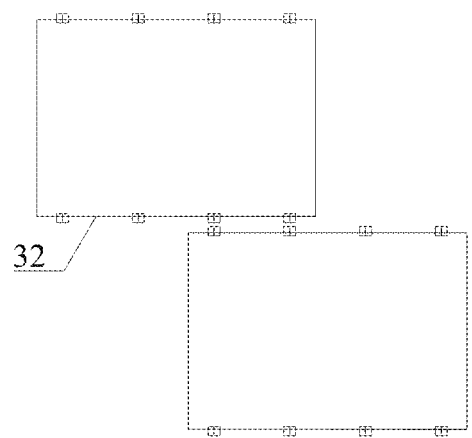
Figure 7C:
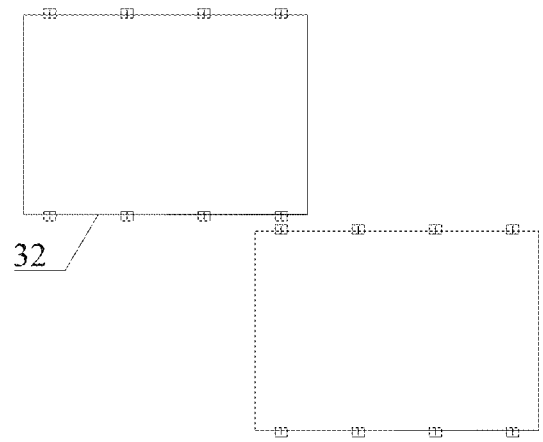
Figure 7D:
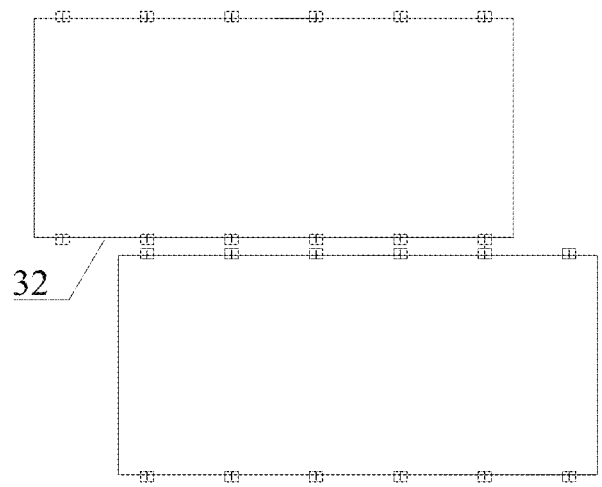
Figure 7E:
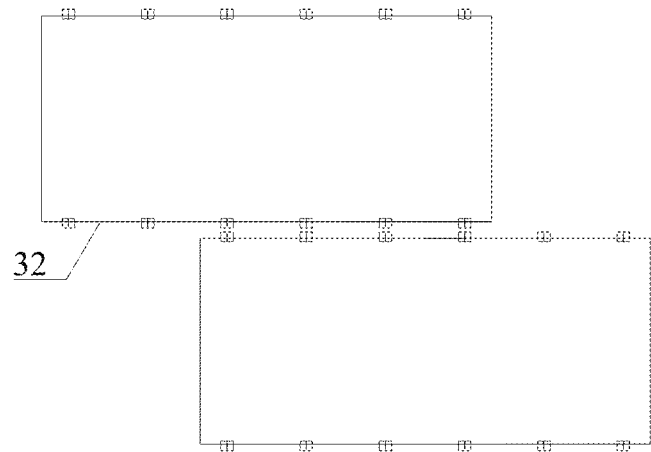
Figure 7F:
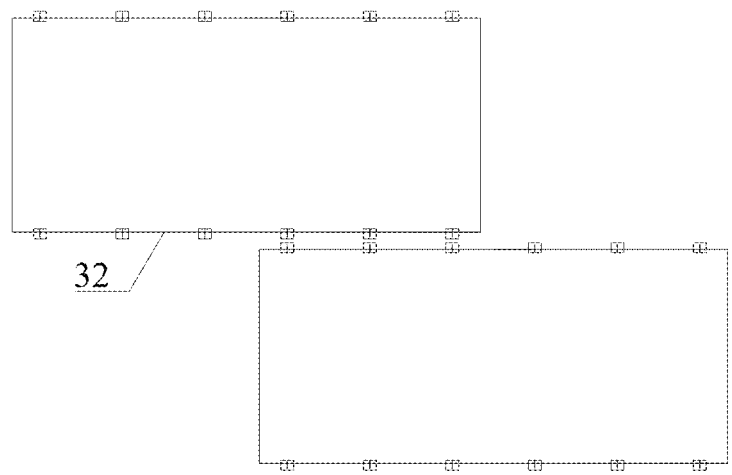

As shown in FIGS. 7a to 7c, the upper layer frame body 1 is retracted by ¼ (a length of a second basic section 32), 2/4 (lengths of two second basic sections 32) and ¾ (lengths of three second basic sections 32) respectively relative to the lower layer frame body 1; and as shown in FIGS. 7d to 7f, the upper layer frame body 1 is retracted by ⅙ (a length of a second basic section 32), 2/6 (lengths of two second basic sections 32) and 3/6 (lengths of three second basic sections 32) respectively relative to the lower layer frame body 1.

Figure 10A:
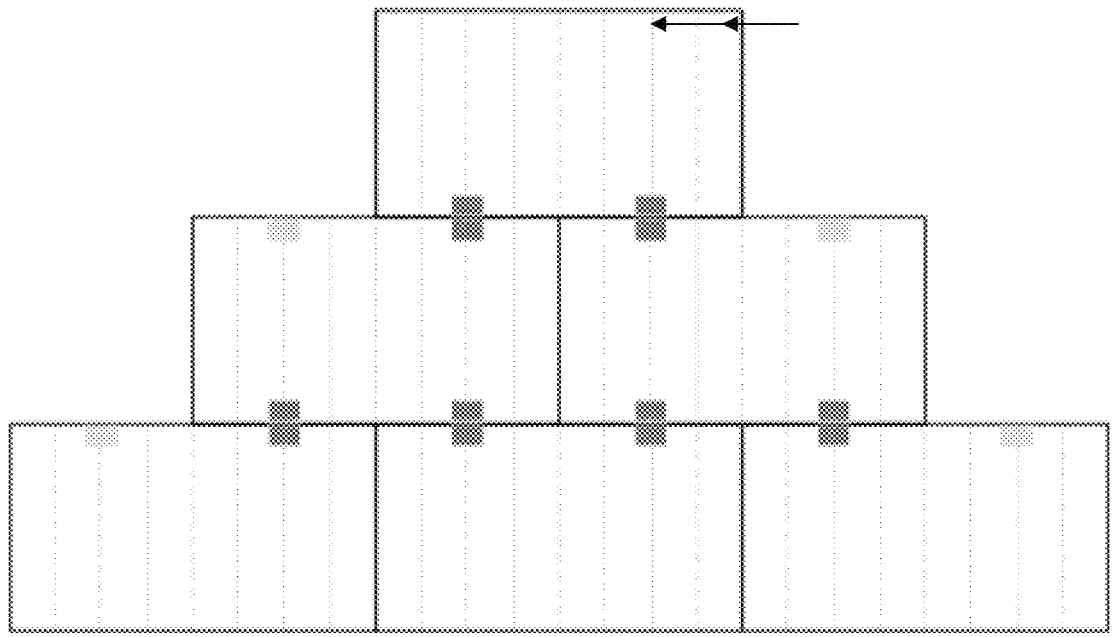
FIG. 10a is a schematic diagram of an outermost side of an upper layer frame body located at one-half position of a lower layer frame body while splicing.
Figure 10B:
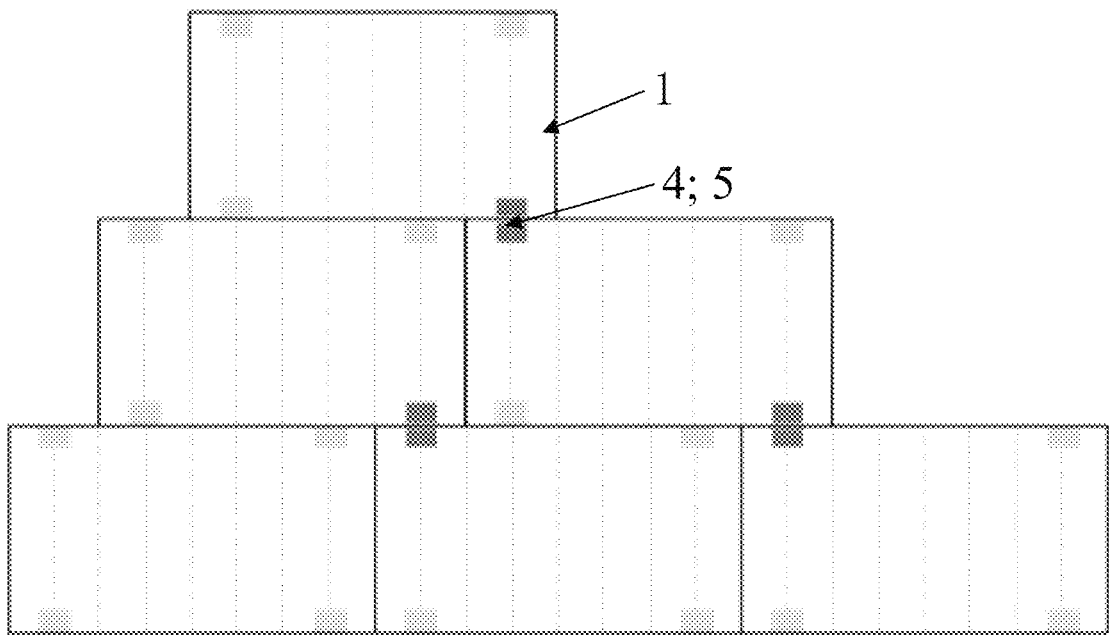
FIG. 10b is a schematic diagram of the outermost side of the upper layer frame body located at one-quarter position of the lower layer frame body while splicing.
Figure 10C:
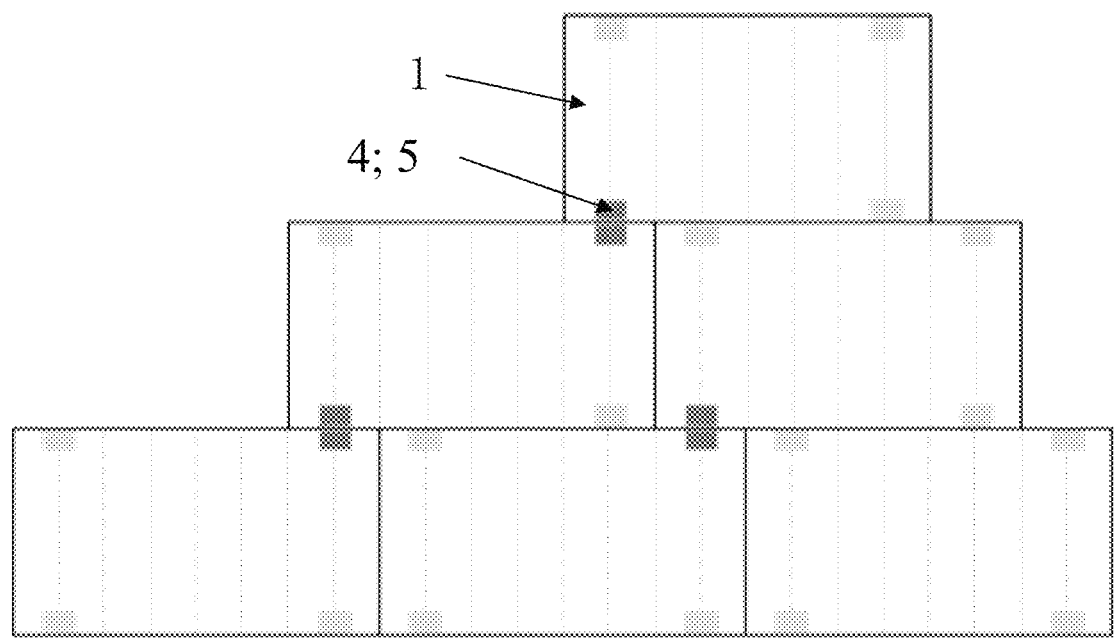
FIG. 10c is a schematic diagram of the outermost side of the upper layer frame body located at three-quarter position of the lower layer frame body while splicing.

In other words, as shown in FIGS. 10*a* to 10*c*, wherein, the special situation that the lengths of the first basic section and the second basic section are equal exists;

As shown in FIG. 10*a*, when an outermost edge of the upper layer frame body is located at a position of ½ of the lower layer frame body while splicing, i.e., the upper and lower frame bodies are displaced by a ½ side length of the frame, locking positions are respectively located at positions of ¼ and ¾ side lengths of the frame of the upper layer frame body.

As shown in FIG. 10*b*, when the outermost edge of the upper layer frame body is located at a position of ¼ of the lower layer frame body while splicing, i.e., the upper and lower frame bodies are displaced by a ¼ side length of the frame, locking positions are respectively located at positions of ⅛ and ⅞ side lengths of the frame of the upper layer frame body.

As shown in FIG. 10*c*, when the outermost edge of the upper layer frame body is located at a position of ¾ of the lower layer frame body while splicing, i.e., the upper and lower frame bodies are displaced by a ¾ side length of the frame, locking positions are respectively located at positions of ⅛ and ⅞ side lengths of the frame of the upper layer frame body.

Figure 8A:
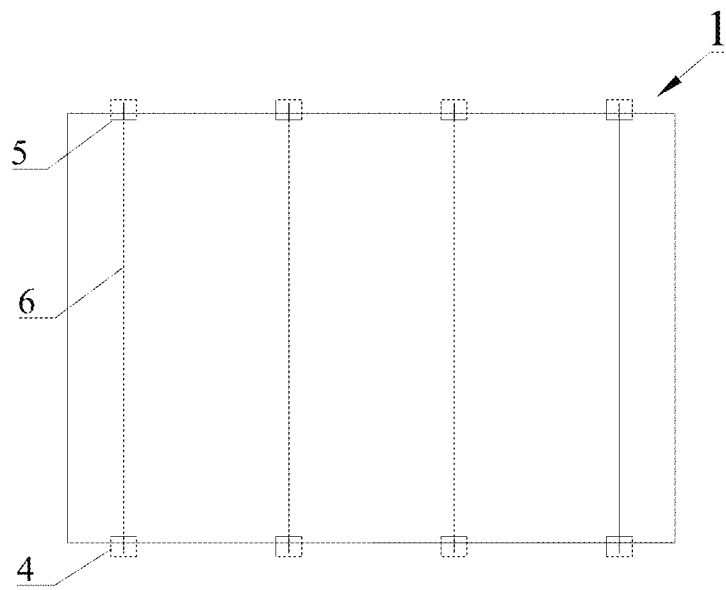
FIG. 8a is a simplified schematic diagram of a frame body having a supporting rod in another splicing frame device according to the present invention.
Figure 8B:
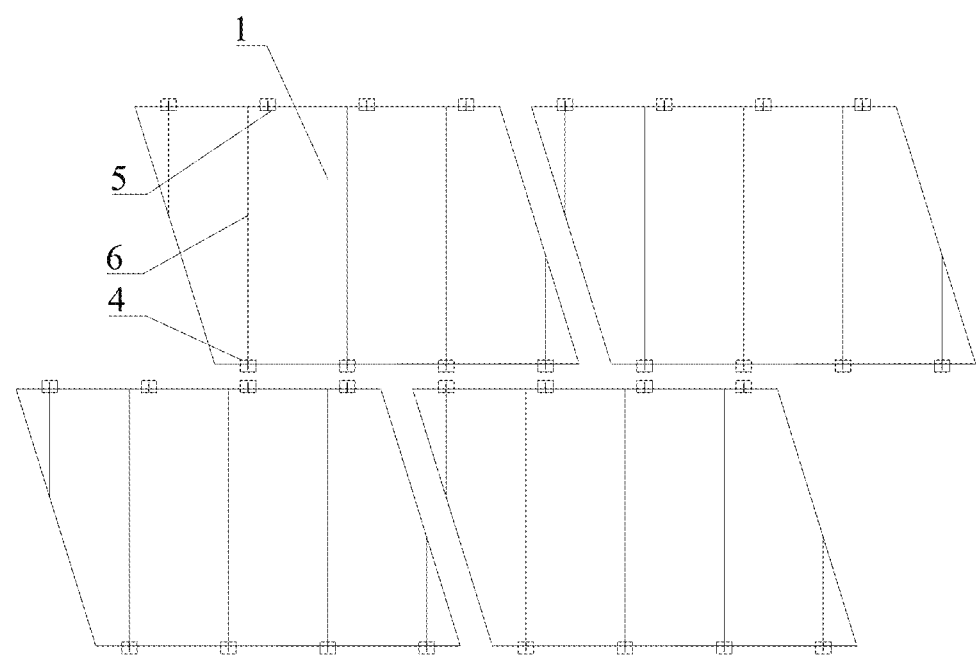
FIG. 8b is a simplified schematic diagram illustrating the structure of another splicing frame device according to the present invention (the frame body has the supporting rod)

Therefore, when the frame bodies are stacked on the ground in layers, the outermost frame of the upper layer frame body is located at the position of $$\frac{m}{n}$$

of the lower layer frame body,
one of the locking points of the upper layer frame body is located at a position of $$\frac{1}{2n}$$

of the locking edge of the upper layer frame, and
the other locking position of the upper layer frame is located at a position symmetric to $$\frac{1}{2n}$$

of the locking position.
For example,
when $$\frac{m}{n}$$

is 1/1 position, i.e., the upper layer frame body coincides with the outermost edge of the lower layer frame body, the locking position is at a position of ½ side length of the frame;
when $$\frac{m}{n}$$

is ½ position, i.e., the outermost edge of the upper layer frame body is located at a middle point position of the lower frame body, the locking position is at a position of ¼ side length of the frame, or is at ¼ and ¾ and positions at least;
when m/n is ¼ position, i.e., the outermost edge of the upper layer frame body is located at a position of ¼ of the lower frame body, the locking position is at a position of ⅛ side length of the frame, or is at ⅛ and ⅞ positions at least;
when $$\frac{m}{n}$$

is ¾ position, i.e., the outermost edge of the upper layer frame body is located at a position of ¾ of the lower frame body, the locking position is at a position of ⅛ side length of the frame, or is at ⅛ and ⅞ positions at least;
It is worth noting that,
if a plurality of misplaced sizes are used for splicing frame bodies, splicing can be implemented as long as the locking position is located at a position of $$\frac{1}{2n}$$

misplaced size.
For example,
if the splicing forms that the misplaced positions between the upper and lower frame bodies are that:

$$\frac{m}{n}$$

is 1/1, $$\frac{m}{n}$$

is ½, and $$\frac{m}{n}$$

is ¼ are used, the locking positions are as follows:
when the displaced position between the upper and lower frame bodies is 1/1, i.e., the upper and lower frame bodies are aligned,
the locking position is located at a position of ½ side length of the frame;
when the displaced position between the upper and lower frame bodies is ½,
the locking position is located at a position of ¼ side length of the frame, and the locking position is located at a position of ¾ side length of the frame;
when the displaced position between the upper and lower frame bodies is ¼,
the locking position is located at a position of ⅛ side length of the frame, and the locking position is located at a position of ⅞ side length of the frame;

Further, as shown in FIGS. 8a and 8b, a supporting rod 6 is arranged in the frame body 1, the first lock catch 4 is a rotary lock catch, one end of the supporting rod 6 is connected to the first lock catch 4, and the other end of the supporting rod 6 is connected to the upper frame; or, the second lock catch 5 is a rotary lock catch, one end of the supporting rod 6 is connected to the second lock catch 5, and the other end of the supporting rod 6 is connected to the lower frame. Chinese Patent with Application No. 201720584834.0 discloses a rotary lock catch, which can be used in this embodiment. In addition, the first lock catch 4 (second lock catch 5) does not have to be a rotary lock catch, for example, a latch lock catch, a press lock catch, and other lock catches are also available. When the first lock catch 4 and the second lock catch 5 are aligned in a vertical direction, two ends of the supporting rod 6 are preferably connected to the first lock catch 4 and the second lock catch 5 respectively. In this embodiment, the supporting rod 6 is a carbon fiber rod.

Figure 9A:
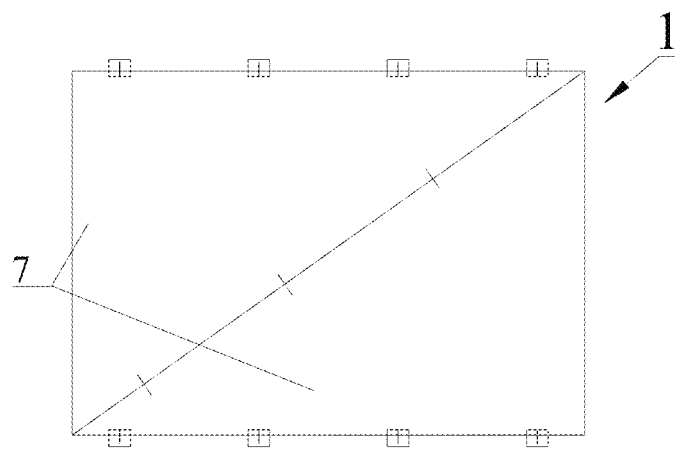
FIG. 9a and FIG. 9b are respectively simplified schematic diagrams illustrating a structure of the frame body in another splicing frame device (the frame body is formed by splicing a sub-frame body)
Figure 9B:
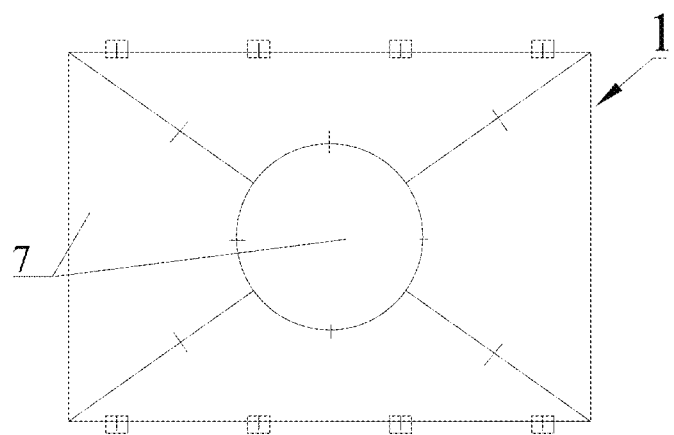

The frame body 1 is a parallelogram, and the frame 1 is preferably a rectangle. It shall be noted that the frame body 1 of parallelogram can be formed by splicing at least two sub-frames 7 of the same or different shapes. As shown in FIG. 9a, the frame body 1 of parallelogram is formed by splicing two triangular frames; and as shown in FIG. 9b, the frame body 1 of parallelogram is formed by splicing a circular frame and four non-standard trapezoidal frames.

Further, at least one set of opposite angles of the frame body 1 are respectively provided with an identification mark, and the identification mark is located at one side of the frame body 1 far from the display screen body. Preferably, four angles of the frame body 1 are all provided with the identification marks.

As shown in FIG. 2, the splicing frame device further comprises a base beam 8 stacked below the frame at the lowest layer, and the base beam 8 comprises at least two beam sections 81 connected to the frame at the lowest layer; and in the frame at the lowest layer, the splicing seam 2 and a gap 82 between two adjacent beam sections 81 are arranged in a misplaced way, and the frame bodies 1 at two sides of the splicing seam 2 are both connected to the beam section 81 at the end of the splicing seam 2. Preferably, the base beam 8 is provided with the second lock catch 5 matched with the first lock catch 4 in the frame at the lowest layer.

A splicing method applied to the splicing frame device, comprises the following steps:
  step S01: selecting a plurality of frame bodies with different sizes according to requirements;
  step S02: transversely arranging at least two frame bodies with the same or different sizes in sequence to form a first layer of frame;
  step S03: placing at least one frame body on an upper or lower layer of the first layer of frame to form a second layer of frame; wherein, when the second layer of frame has more than two frame bodies, splicing seams of the second layer of frame and the first layer of frame are arranged in a misplaced way, and the frame bodies located at two sides of the splicing seam are respectively connected to the frame body at an end of the splicing seam; and
  step S04: continuously arranging other layers of frame bodies on the first layer of frame or below the second layer of frame according to step S03.

The method further comprises a step S05 after step S04: when a vacancy exists between two adjacent layers of frames, selecting the frame body consistent with a length of the vacancy placing the frame body into the vacancy, and connecting the frame body to at least one of the upper layer of frame and the lower layer of frame.

Referring to FIG. 2, a small frame body in a top right corner in FIG. 2 is the result obtained through performing step S05 of the assembling method.

The technical solution of the present application can be used in LED, LCD, and the like.

In conclusion, the splicing frame device provided by the present invention can also be an integral structure even without a transverse connecting structure, which greatly improves structure stability of the splicing frame device and is conductive to reducing the manufacturing cost of the splicing frame device; no transverse connecting structure or device is required, which is conductive to reducing a size of the splicing seam and improving a display effect of a display screen having the splicing frame device; and a user can conduct personalized splicing, which is conductive to improving the user experience.

The invention claimed is:

1. A splicing frame device for installing a display screen body, comprising at least two layers of frames connected up and down, and each layer of frame comprising at least two frame bodies, wherein: in two adjacent layers of frames, a splicing seam between the frame bodies in the upper layer and a splicing seam between the frame bodies in the lower layer are arranged in a misplaced way, and the frame bodies at two sides of the splicing seam are both connected to the frame body at an end of the splicing seam; and
  the frame body comprises an upper frame and a lower frame with equal lengths, the lower frame is composed of two first basic sections and N second basic sections, a sum of lengths of the two first basic sections and lengths of the N second basic sections is equal to a length of the lower frame, and N is an integer greater than or equal to 0; and the second basic section is located between the two first basic sections, a sum of lengths of the two first basic sections and a width of the splicing seam is equal to the length of the second basic section.

2. The splicing frame device according to claim 1, wherein:
  in the same frame body, the lengths of the two first basic sections are equal.

3. The splicing frame device according to claim 2, wherein: in the same frame body, the length of the first basic section is less than or equal to a half length of the second basic section.

4. The splicing frame device according to claim 3, wherein: at least one layer of frame has more than two frame bodies having the lower frames with different lengths.

5. The splicing frame device according to claim 2, wherein: at least one layer of frame has more than two frame bodies having the lower frames with different lengths.

6. The splicing frame device according to claim 1, wherein:
  at least one layer of frame has more than two frame bodies having the lower frames with different lengths.

7. The splicing frame device according to claim 6, wherein: in the same frame body, the lower frame is provided with a first lock catch, and the upper frame is provided with a second lock catch matched with the first lock catch in the lower frame of the other frame body; when N is equal to 0, a quantity of the first lock catch is equal to one, and the first lock catch is located at a joint of the two first basic sections; and when N is greater than 0, the quantity of the first lock catch is greater than or equal to 1, and the first lock catch is located at an end of the second basic section.

8. The splicing frame device according to claim 7, wherein: in the frame body, the quantity of the first lock catch is N+1, when N is greater than 0, two ends of the second basic section are both provided with the first lock catch.

9. The splicing frame device according to claim 8, wherein: in the frame body, a quantity of the second lock catch is equal to the quantity of the first lock catch, and the second lock catch is arranged in one-to-one correspondence with the first lock catch.

10. The splicing frame device according to claim 7, wherein: a supporting rod is arranged in the frame body, the first lock catch is a rotary lock catch, one end of the supporting rod is connected to the first lock catch, and the other end of the supporting rod is connected to the upper frame; or, the second lock catch is a rotary lock catch, one end of the supporting rod is connected to the second lock catch, and the other end of the supporting rod is connected to the lower frame.

11. The splicing frame device according to claim 10, wherein: the supporting rod is a carbon fiber rod.

12. The splicing frame device according to claim 7, wherein: the frame body is a parallelogram, and the frame body is formed by splicing at least two sub-frame bodies.

13. The splicing frame device according to claim 7, wherein: at least one set of opposite angles of the frame body are respectively provided with an identification mark, and the identification mark is located at one side of the frame body far from the display screen body.

14. The splicing frame device according to claim 7, further comprising a base beam stacked below the frame at the lowest layer, wherein the base beam comprises at least two beam sections connected to the frame at the lowest layer; and in the frame at the lowest layer, the splicing seam and a gap between two adjacent beam sections are arranged in a misplaced way, and the frame bodies at two sides of the splicing seam are both connected to the beam section at the end of the splicing seam.

15. The splicing frame device according to claim 1, wherein: the frame body is a parallelogram, and the frame body is formed by splicing at least two sub-frame bodies.

16. The splicing frame device according to claim 1, wherein:
at least one set of opposite angles of the frame body are respectively provided with an identification mark, and the identification mark is located at one side of the frame body far from the display screen body.

17. The splicing frame device according to claim 1, further comprising a base beam stacked below the frame at the lowest layer, wherein the base beam comprises at least two beam sections connected to the frame at the lowest layer; and in the frame at the lowest layer, the splicing seam and a gap between two adjacent beam sections are arranged in a misplaced way, and the frame bodies at two sides of the splicing seam are both connected to the beam section at the end of the splicing seam.

18. A splicing method applied to the splicing frame device according to claim 1, comprising the following steps:
step S01: selecting a plurality of frame bodies with different sizes according to requirements;
step S02: transversely arranging at least two frame bodies with the same or different sizes in sequence to form a first layer of frame;
step S03 of placing at least one frame body on an upper or lower layer of the first layer of frame to form a second layer of frame; wherein, when the second layer of frame has more than two frame bodies, splicing seams of the second layer of frame and the first layer of frame are arranged in a misplaced way, and the frame bodies located at two sides of the splicing seam are respectively connected to the frame body at an end of the splicing seam; and
step S04 of continuously arranging other layers of frame bodies on the first layer of frame or below the second layer of frame according to step S03.

19. The splicing method according to claim 18, further comprising step S05 after the step S0: when a vacancy exists between two adjacent layers of frames, selecting the frame body consistent with a length of the vacancy placing the frame body into the vacancy, and connecting the frame body to at least one of the upper layer of frame and the lower layer of frame.

* * * * *